(12) United States Patent
Horigane

(10) Patent No.: US 6,334,721 B1
(45) Date of Patent: Jan. 1, 2002

(54) PRINTING SYSTEM AND DATA PROCESSING METHOD THEREOF

(75) Inventor: Ryuichi Horigane, Kanagawa (JP)

(73) Assignee: Fuji Xerox Co., LTD, Tokyo (JP)

( * ) Notice: Subject to any disclaimer, the term of this patent is extended or adjusted under 35 U.S.C. 154(b) by 0 days.

(21) Appl. No.: 09/217,948

(22) Filed: Dec. 22, 1998

(30) Foreign Application Priority Data

Dec. 25, 1997 (JP) ............................................. 9-357522

(51) Int. Cl.[7] .............................. B41J 11/44; B41J 5/30
(52) U.S. Cl. .............................. 400/76; 400/61; 400/70
(58) Field of Search ............................. 400/70, 76, 61; 235/375; 399/366

(56) References Cited

U.S. PATENT DOCUMENTS 5,486,686 A * 1/1996 Zdybel, Jr. et al. ......... 235/375
5,668,636 A * 9/1997 Beach et al. ................. 358/296
5,901,224 A * 5/1999 Hecht ............................. 380/4
6,175,714 B1 * 1/2001 Crean .......................... 399/366

FOREIGN PATENT DOCUMENTS

JP 8-50598 2/1996

* cited by examiner

Primary Examiner—John S. Hilten
Assistant Examiner—Charles H. Nolan, Jr.
(74) Attorney, Agent, or Firm—Finnegan, Henderson, Farabow, Garrett & Dunner, L.L.P.

(57) ABSTRACT

A printing system for printing application data instructed to be printed from an application at a printer, which comprises first intermediate data preparation means for preparing first intermediate data from the application data, second intermediate data preparation means for preparing second intermediate data having the same data format as the first intermediate data from the first intermediate data, and print data preparation means for preparing print data that can be processed at the printer from the second intermediate data.

7 Claims, 11 Drawing Sheets

FIG. 3

PRINT DIALOG

PAPER SIZE
⊙ A4    ○ B4    ○ A3

N-UP
○ 1-UP    ○ 2-UP    ○ 3-UP

SCALING FACTOR [    ]

PAPER ORIENTATION
⊙ PORTRAIT    ○ LANDSCAPE

MARGIN
LEFT [    ]    RIGHT [    ]
UPPER [    ]    LOWER [    ]

CODED DATA

DATA TYPE
○ CHARACTER STRING
⊙ INTEGER
○ REAL
○ URL

VALUE [ 1 2 3 4 5 6 7 8 9 0 ]

[ OK ]    [ CANCEL ]

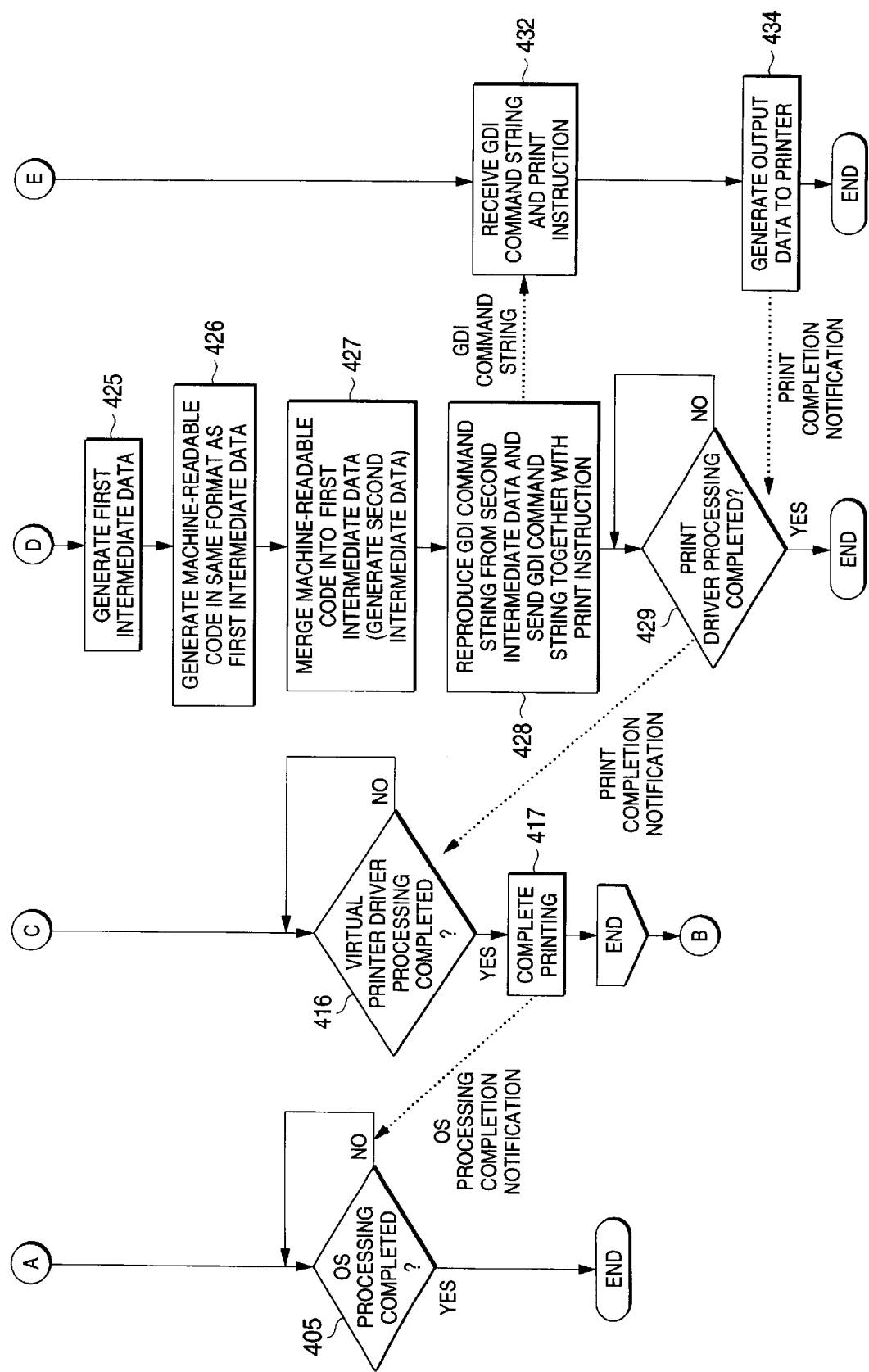

PRINTING SYSTEM AND DATA PROCESSING METHOD THEREOF

BACKGROUND OF THE INVENTION

The present invention relates to a printing system for printing data instructed to be printed by an application at a printer. Specifically, the present invention relates to an improvement in a data processing method to enable application data to be printed out at any printers from every application having a printing function.

To print an electronic file prepared or edited by an application, there is known a system for embedding machine-readable code in the electronic file and printing the electronic file with the machine-readable code embedded. Some systems of this kind use electronic file identification information, for example, as the machine-readable code. In this case, the machine-readable code is embedded in a document file instructed to be printed from an application and the document file with the machine-readable code embedded is printed out, then the output paper is read and scanned through a code reader (scanner), whereby it is made possible to recognize the machine-readable code and to manage the electronic file related to the machine-readable code.

An electronic document retrieval system described in Unexamined Japanese Patent Publication No. Hei 8-50598 is known as an example of a related system having a code addition and printing function intended for managing such print files. To print out an electronic document, the system outputs added information to the electronic document to paper and stores the electronic document in a database at the same time; particularly, a bar code is used as the added information output to paper and can be read to retrieve the electronic document.

In this kind of related system typified by the electronic document retrieval system described above, normally, to use one printer to print out the machine-readable code to an electronic file, a printer driver that can drive the printer and an application adapted to the printer driver are provided, needless to say.

This means that this kind of related system does not give consideration to allowing an electronic file prepared in one application to be printed at any printer.

Thus, in the related system, used printers are limited depending on the used application and used applications are limited depending on the used printer. Resultantly, there is significantly limited construction of such a system, for example, embedding machine-readable code in an electronic file and printing the electronic file with the machine-readable code embedded, then reading the machine-readable code for retrieving the electronic file related thereto.

SUMMARY OF THE INVENTION

It is therefore the first object of the present invention to provide a printing system and a data processing method thereof to enable application data to be printed out at any printer from every application having a printing function.

It is the second object of the present invention to provide a printing system and a data processing method thereof to enable application data to be printed out at any printer from an application even if machine-readable code is embedded in the application data and the application data with the machine-readable code embedded is printed.

It is the third object of the present invention to provide a printing system and a data processing method thereof to enable application data to be printed out at any printer from an application even if N-up print, etc., is executed for the application data.

It is the fourth object of the present invention to provide a printing system and a data processing method thereof capable of executing non-print processing operation of application data concurrently with print processing of the application data.

In order to achieve the above object, there is provided a printing system for printing application data instructed to be printed from an application at a printer, the printing system comprises: first intermediate data preparation means for preparing first intermediate data from the application data; second intermediate data preparation means for preparing second intermediate data having the same data format as the first intermediate data from the first intermediate data; and print data preparation means for preparing print data that can be processed at the printer from the second intermediate data.

According to the first aspect of the present invention, the second intermediate data preparation means includes data merge means for merging machine-readable code into the first intermediate data, thereby preparing the second intermediate data.

The machine-readable code is at least any one of identification information, print date information, number-of-page information, source host device information, and preparation operation system name information of the application data.

According to the second aspect of the present invention, the second intermediate data preparation means includes data conversion means for converting the fist intermediate data into data corresponding to print control information specified accompanying the print instruction, thereby preparing the second intermediate data.

The print control information is any one of control information pieces specifying N-up print, scaled-up print, and scaled-down print for the application data.

According to the third aspect of the present invention, the printing system further comprises: operation instruction means for specifying non-print processing operation other than print processing for the application data; and non-print processing control means for executing the non-print processing operation instructed by the operation instruction means while print data preparation processing is performed by the print data preparation means.

The non-print processing operation is at least any one of processing operation of registering the second intermediate data in a server, processing operation of transmitting the second intermediate data by mail, and processing operation of transmitting the second intermediate data with a facsimile machine.

In order to achieve the above object, there is also adopted a data processing method of a printing system for printing application data instructed to be printed from an application at a printer, the data processing method comprising the steps of: preparing first intermediate data from the application data; preparing second intermediate data having the same data format as the first intermediate data from the first intermediate data; and preparing print data that can be processed at the printer from the second intermediate data.

According to the fourth aspect of the present invention, machine-readable code is merged into the first intermediate data, thereby preparing the second intermediate data.

The machine-readable code is at least any one of identification information, print date information, number-of-page information, source host device information, and information of operation system name in which the application data is prepared.

According to the fifth aspect of the present invention, the first intermediate data is converted into data corresponding to print control information specified accompanying the print instruction, thereby preparing the second intermediate data.

The print control information is any one of control information pieces specifying N-up print, scaled-up print, and scaled-down print for the application data.

According to the sixth aspect of the present invention, the data processing method further comprises the steps of: specifying selectively non-print processing operation other than print processing for the application data; and executing the instructed non-print processing operation while performing print data preparation processing.

The non-print processing operation is at least any one of processing operation of registering the second intermediate data in a server, processing operation of transmitting the second intermediate data by mail, and processing operation of transmitting the second intermediate data with a facsimile machine.

BRIEF DESCRIPTION OF THE DRAWINGS

In the accompanying drawings:

FIG. 3 is an illustration to show an example of a print dialog used for setting print conditions;

DETAILED DESCRIPTION OF THE PREFERRED EMBODIMENTS

Figure 1:
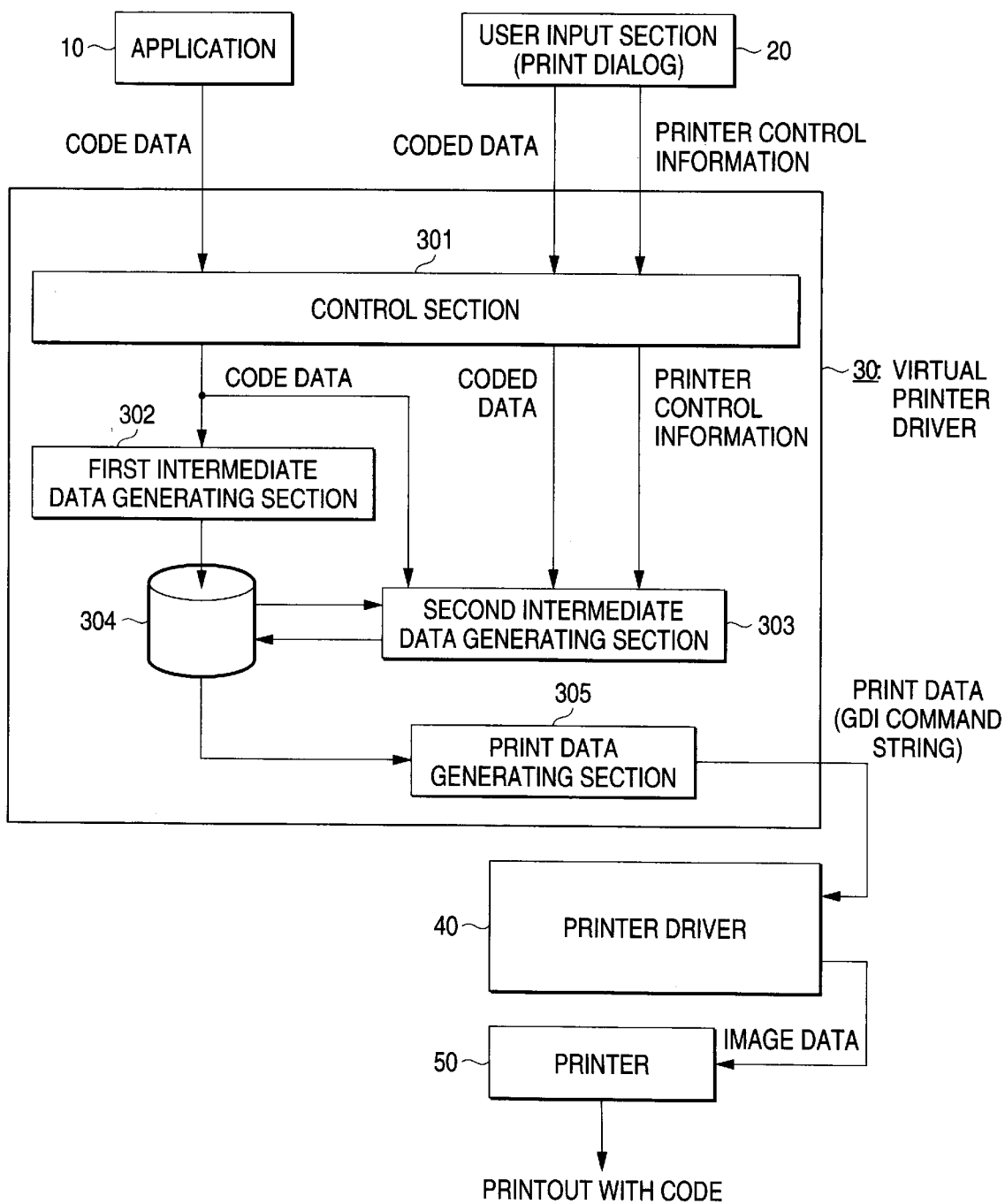
FIG. 1 is a block diagram to show a schematic configuration of a printing system according to one embodiment of the present invention.

Referring now to the accompanying drawings, there are shown preferred embodiments of the present invention. FIG. 1 is a block diagram to show a schematic configuration of a printing system according to one embodiment of the present invention. The printing system comprises an application 10 having at least data edit and printing functions, a user input section 20 for entering print conditions of coded data to obtain machine-readable code embedded in code data of an electronic file instructed to be printed by the application 10 (electronic file contents) and printed, print parameters of the electronic file (printer control information), or the like, a virtual printer driver 30 for generating print data that can be printed at a printer 50 from the code data according to the print conditions entered through the user input section 20, a printer driver 40 for driving the printer 50 based on the print data output from the virtual printer driver 30, and the printer 50 for printing out the print data under the drive control of the printer driver 40.

The virtual printer driver 30 placed between the application 10 and the printer driver 40 comprises a first intermediate data generating section 302 for generating first intermediate data from the code data input from the application 10, a second intermediate data generating section 303 for generating second intermediate data in the same data format as the first intermediate data from the first intermediate data generating section according to the print conditions entered through the user input section 20, a data storage section 304 for storing the first intermediate data and the second intermediate data, a print data generating section 305 for generating print data that can be printed at the printer 50 from the second intermediate data stored on the data storage section 304 and sending the print data to the printer driver 40, and a control section 301 for controlling integrally the first intermediate data generating section 302, the second intermediate data generating section 303, the data storage section 304, and the print data generating section 305.

Figure 2:
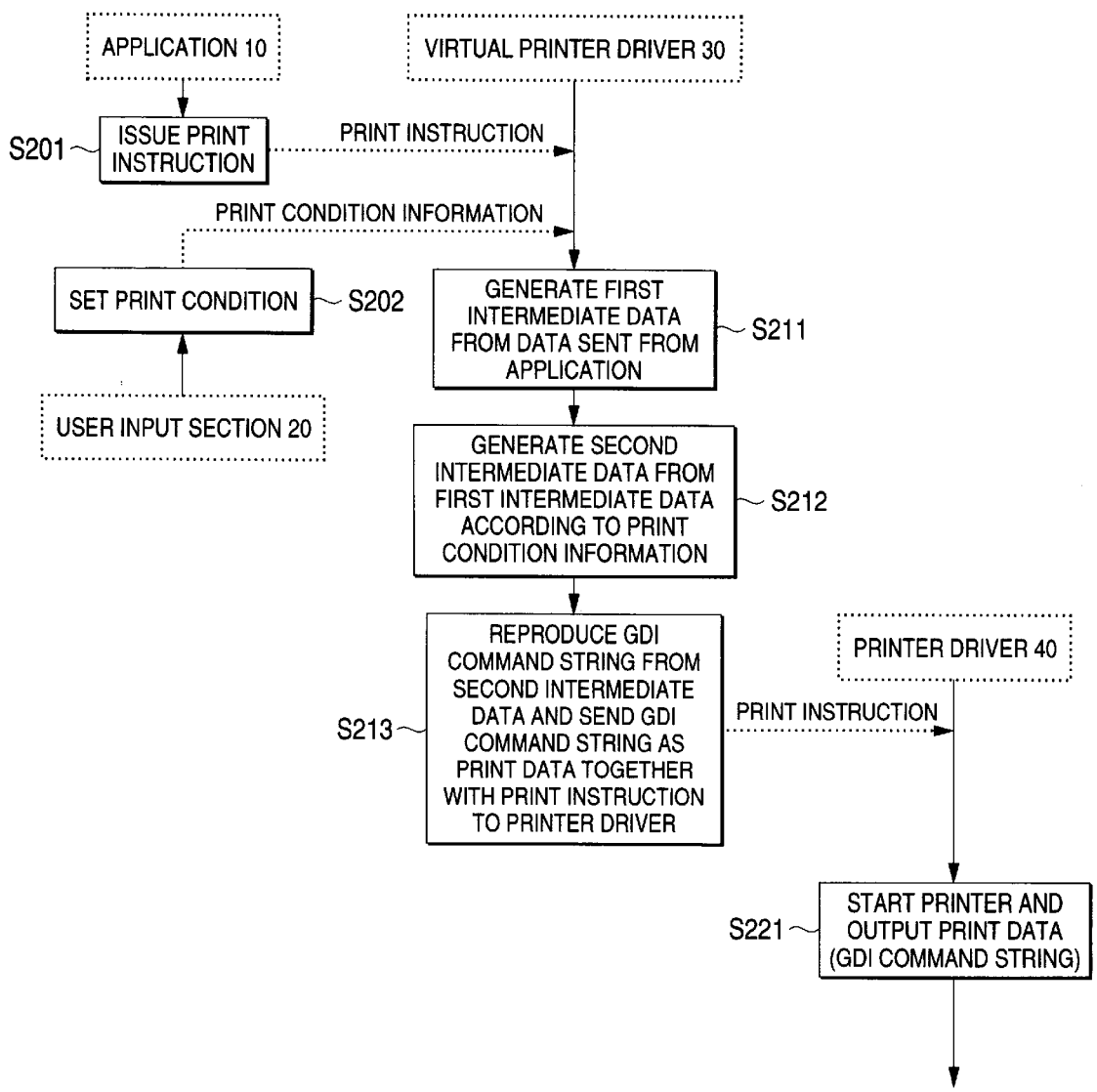
FIG. 2 is a flowchart to show the print processing operation of the printing system in FIG. 1.

Next, general operation for printing an electronic file instructed to be printed from the application 10 in the printing system will be discussed with reference to a flowchart shown in FIG. 2.

To print any electronic file created by the application 10 from the application 10 in the printing system, the user issues an instruction for printing the electronic file to be printed at step S201. When the print instruction is issued, the user input section 20 displays a print dialog, for example, as shown in FIG. 3, and accepts setting of print conditions of the electronic file instructed to be printed at step S202. As seen in the example in FIG. 3, the input conditions that can be entered by the user using the print dialog through the user input section 20 in response to the print instruction from the application 10 include various pieces of information of paper size and orientation, enable or disable of N-up print and scaled printing, and margin information in addition to coded data to obtain machine-readable code embedded in the data of the electronic file instructed to be printed.

Upon completion of setting the print conditions on the print dialog, the code data of the electronic file instructed to be printed is input from the application 10 to the virtual printer driver 30 and the user-setup print parameters, coded data, and the like are input from the user input section 20 to the virtual printer driver 30.

In the virtual printer driver 30, the first intermediate data generating section 302 generates first intermediate data from the code data sent from the application 10 at first step S211 and stores the first intermediate data in the data storage section 304. The first intermediate data has a format to enable a GDI (Graphic Device Interface) command to be reproduced at step S213 described later. Various metafiles such as WMF (Windows MetaFile) and EMF (Enhanced MetaFile) can be named as examples of the first intermediate data (Windows is a registered trademark of Microsoft USA). In addition, the first intermediate data may be an originally determined format if it satisfies the requirement that GDI commands can be reproduced.

On the other hand, the print condition information set by the user is input from the user input section 20 to the second intermediate data generating section 303, which then generates second intermediate data according to the print conditions from the first intermediate data stored on the data storage section 304 at step S212 and stores the second intermediate data in the data storage section 304.

At step 212, the coded data input from the user input section 20 is coded as machine-readable code, then the machine-readable code is embedded in the first intermediate data and data in the same format as the first intermediate data (second intermediate data) is generated, or the first intermediate data is converted into data for N-up print, scaled print, etc., (second intermediate data) in the same format as the first intermediate data based on the print parameters (N-up print, scaled print, etc.,) input from the user input section 20.

Next, the print data generating section 305 reproduces a GDI command string from the data stored in the second intermediate data in the data storage section 304 and sends the GDI command string as print data together with the print instruction to the printer driver 40 at step S213. For this process, Windows API can be used for printing if the second intermediate data is formed of a WMF or EMF mentioned above.

The printer driver 40 starts the printer 50 in response to the print instruction sent from the print data generating section 305 and outputs the print data (GDI command string) to the printer 50 at step S221. Further, the printer 50 prints out the print data.

Thus, the printing system of the present invention is constituted such that the virtual printer driver 30 (provided by the application) is placed on an interface between the application 10 and the printer driver 40, and the virtual printer driver 30 generates intermediate data to allow GDI code to be reproduced from application data instructed to be printed from the application 10 at first and further reproduces GDI code based on the intermediate data for generating print data, then feeds the print data into the printer driver 40. That is, in the printing system of the present invention, the virtual printer driver 30 corresponds to the printer driver if viewed from the application, or to the application if viewed from the printer driver 40. The virtual printer driver 30 thus placed on the interface enables any printer 50 to print out in various modes of machine-readable code embedding and printing, N-up print, scaled print, etc., from every application 10 having a print function.

Figure 4:
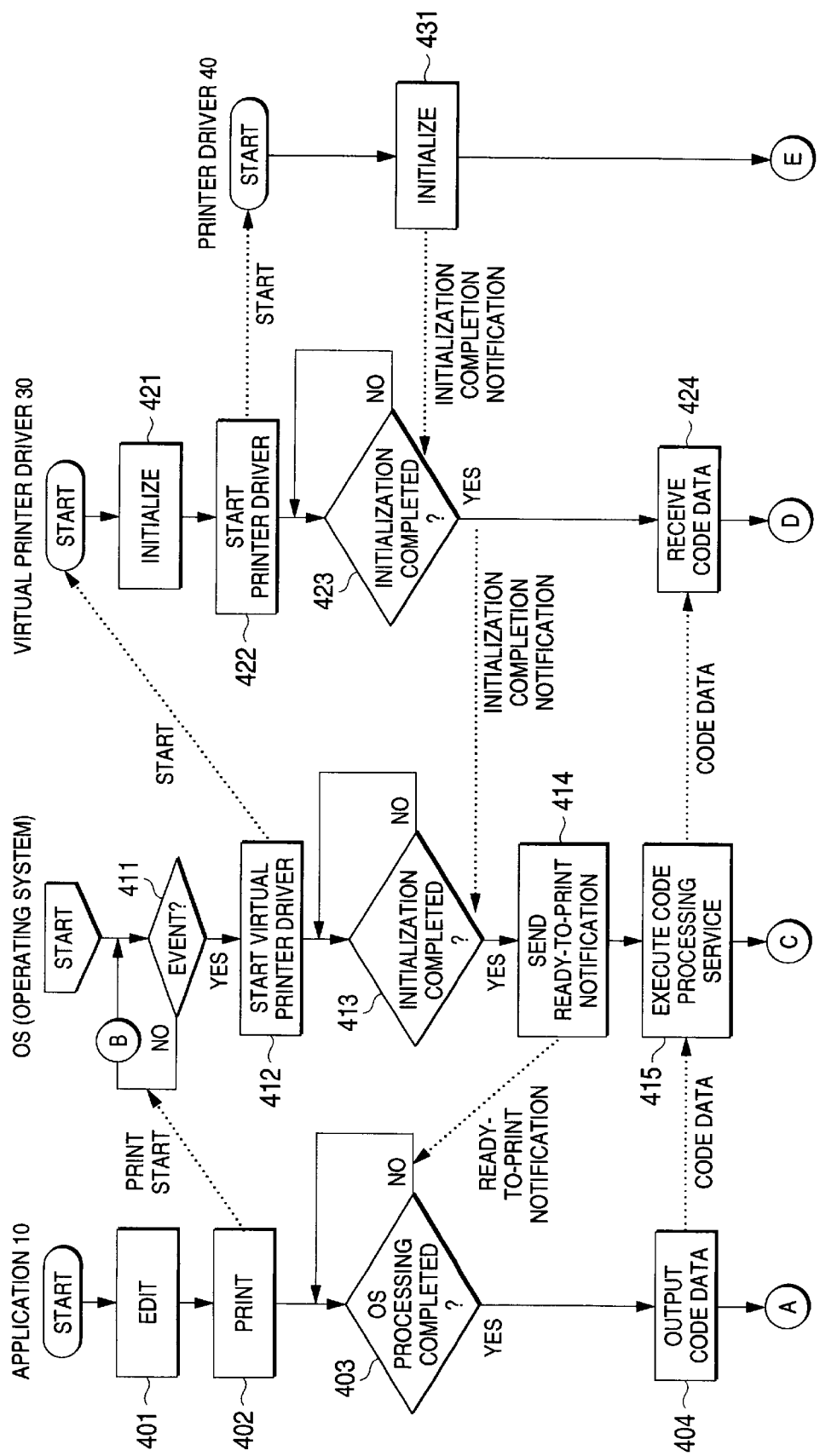
FIGS. 4(a) and (b) are flowcharts to show the processing flow of the whole system in the code embedding and printing operation.
Figure 5:
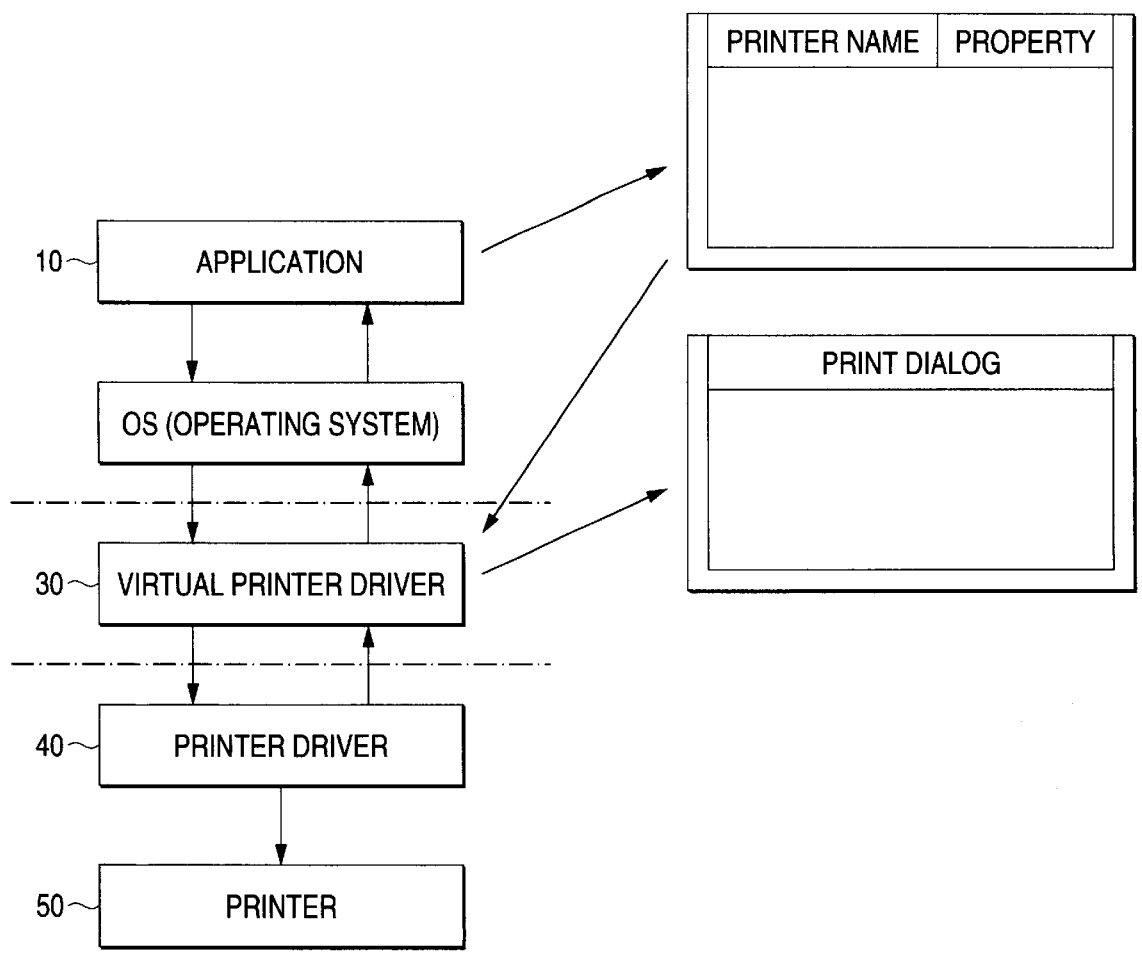
FIG. 5 is a schematic block diagram of the printing system used to explain the processing operation shown in FIGS. 4(a) and (b)
Figure 6:
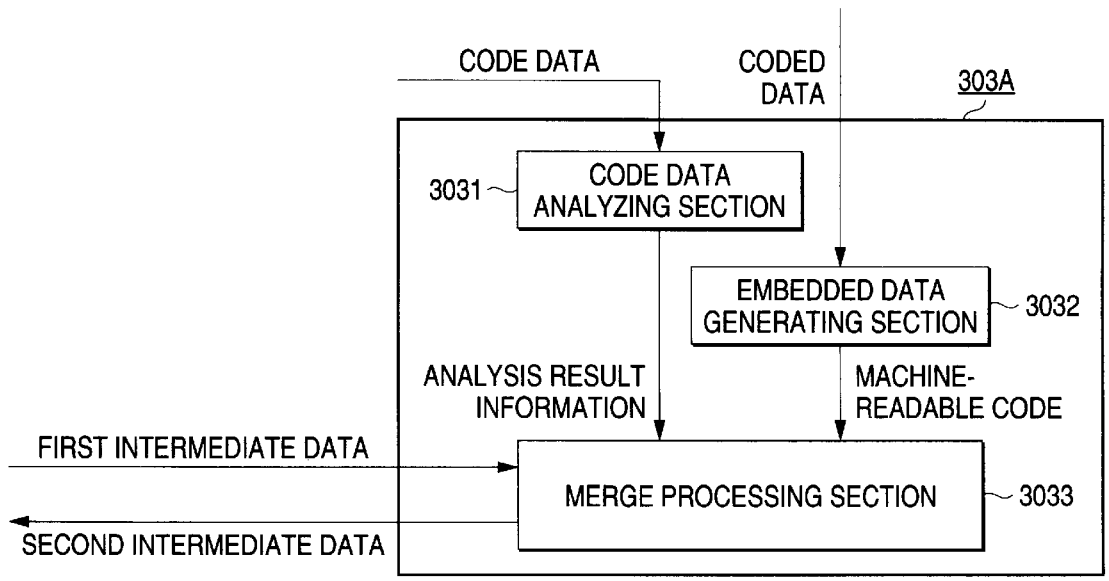
FIG. 6 is a block diagram to show the configuration of a second intermediate data generating section adaptable to code embedding and printing.

Next, a specific example of the print processing operation of the printing system will be discussed in detail with reference to a flowcharts shown in FIGS. 4(*a*) and (*b*). FIG. 5 is a schematic block diagram of the printing system used to explain the print processing according to the flowcharts shown in FIGS. 4(*a*) and (*b*). The flowcharts shown in FIGS. 4(*a*) and (*b*) corresponds particularly to a flow of print processing for embedding machine-readable code in an electronic file that the user instructs to be printed and printing the electronic file with the machine-readable code embedded. In this case, a second intermediate data generating section 303A comprising a code data analyzing section 3031, an embedded data generating section 3032, and a merge processing section 3033 as shown in FIG. 6 is used as the second intermediate data generating section 303 in the virtual printer driver 30.

As shown in FIG. 5, in the printing system, the virtual printer driver 30 exists between the application 10 and the printer driver 40 for controlling the printer 50 and an operating system (OS) intervenes between the virtual printer driver 30 and the application 10. The application 10 has a function of displaying a print operation dialog, for example, as shown in the upper-right portion of FIG. 5 when an electronic file created by the application 10 is printed. If property is selected, for example, in the print operation dialog of the application 10, a print dialog of the user input section 20, for example, as shown in FIG. 3 is opened. The user uses the print dialog to enter print parameters of the electronic file to be printed from the application 10, data to be coded (coded data), etc.

While one electronic file is edited in the application 10 at step S401, the virtual printer driver 30 and the printer driver 40 intervening between the application 10 and the printer 50 are in an idle state. At this time, the OS for controlling execution of the application 10 checks to see whether some event is specified from the application 10 at step S411 (event check loop).

In this state, if an instruction for printing the electronic file being edited is given from the application 10 at step S402, the OS recognizes that an event occurs and is a print instruction (YES at step S411), and sends a start instruction to the virtual printer driver 30 at step S412, whereby the virtual printer driver 30 is placed in a start state, first performs initialization processing at step S421, next sends a start instruction to the printer driver 40 at step S422, then waits for an initialization completion notification from the printer driver at step S423.

In response to the start instruction from the virtual printer driver 30, the printer driver 40 performs initialization processing, then returns an initialization completion notification to the virtual printer driver 30 at step S431. Upon reception of the initialization completion notification (YES at step S423), the virtual printer driver 30 notifies the OS of the initialization completion.

On the other hand, after sending the start instruction to the virtual printer driver 30, the OS checks to see whether an initialization completion notification is sent from the virtual printer driver 30. In this state, if the OS receives an initialization completion notification from the virtual printer driver 30 (YES at step S413), it recognizes that the virtual printer driver 30 becomes ready to print, and sends a ready-to-print notification to the application 10 at step S414.

After issuing the print instruction at step S402, the application 10 checks to see whether the OS processing is complete. Upon reception of a ready-to-print notification from the OS (YES at step S403), the application 10 determines that the OS processing is complete, and outputs code data to the OS at step S404.

The OS, which receives the code data, executes predetermined code processing service at step S415 and sends the code data undergoing the service to the virtual printer driver 30.

The process of steps S404 to S415 corresponds to the process wherein a print dialog (user input section 20) as shown in FIG. 3 is displayed based on the print instruction from the application 10 and the user uses the print dialog to enter data to be coded (coded data) and print parameters for the code data in the document file contents (code data) to be printed, input from the application 10 in response to the print instruction, as described above. The code data input from the application 10 and the coded data and print parameters entered by the user using the print dialog to which the code processing service is applied are output to the virtual printer driver 30.

When the code data output at step S415 in the OS is received at step S424 in the virtual printer driver 30, first, the first intermediate data generating section 302 generates first intermediate data in a format to enable the data to be reproduced as GDI code in the later processing based on the received code data at step S425 and stores the first intermediate data on the data storage section 304.

In the second intermediate data generating section 303A (see FIG. 6) of the virtual printer driver 30, the code data analyzing section 3031 analyzes the code data received from the OS and sends the analysis result to the merge processing section 3033. On the other hand, the embedded data generating section 3032 generates machine-readable code to be embedded in the code data instructed to be printed based on the coded data input from the user input section 20 at step S426 and sends the machine-readable code to the merge processing section 3033.

Further, the merge processing section 3033 reads the first intermediate data from the data storage section 304, then merges the machine-readable code generated at step S426 into the first intermediate data in accordance with the analysis result of the code data analyzing section 3031 and the print parameters, etc., input from the user input section 20 for generating second intermediate data at step S427 and stores the second intermediate data in the data storage section 304. The second intermediate data is prepared in a format similar to that of the first intermediate data.

Then, in the virtual printer driver 30, the print data generating section 305 reproduces a GDI command string from the second intermediate data for generating print data and sends the print data together with the print instruction to the printer driver 40 at step S428.

Upon reception of the print instruction and the print data (GDI command string) from the virtual printer driver 30 at step S432, the printer driver 40 starts the printer 50 and outputs the print data at step S434. Further, the printer 50 prints out the print data received from the printer driver 40.

After sending the print data to the printer 50, the printer driver 40 sends a print completion notification to the virtual printer driver 30. Upon reception of the print completion notification from the printer driver 40, the virtual printer driver 30 recognizes that processing of the printer driver 40 is complete, and sends a print completion notification to the OS at step S429.

After executing the code processing service, the OS checks to see whether the processing of the virtual printer driver 30 is complete. Meanwhile, if the OS receives the print completion notification from the virtual printer driver 30 (YES at step S416), it determines that processing of the virtual printer driver 30 is complete, and terminates the operation at step S417. At the time, the OS sends an OS processing completion notification to the application 10, then returns to the event check loop. On the other hand, after outputting the code data, the application 10 checks to see whether the OS processing is complete. Upon reception of the OS processing completion notification from the OS (YES at step S405), the application 10 terminates the print processing sequence.

As seen from the description of the processing sequence, the virtual printer driver 30 performs (a) to (c) at steps S424 to S428 as follows:

(a) the first intermediate data that can be reproduced in GDI code is generated from the electronic file instructed to be printed from the application 10;

(b) the machine-readable code is generated from coded data input accompanying the print instruction, then is merged into the first intermediate data for generating second intermediate data in the same format as the first intermediate data; and (c) a GDI code string is reproduced from the second intermediate data, whereby print data is generated and a print instruction is given to the printer driver 40.

The machine-readable code set by the user through the user input section 20 is merged into the print data resulting from performing processing of (a) to (c). Thus, the print data is printed out at the printer 50 through the printer driver 40, whereby a printout with the machine-readable code embedded in the application data can be provided.

Figure 7:
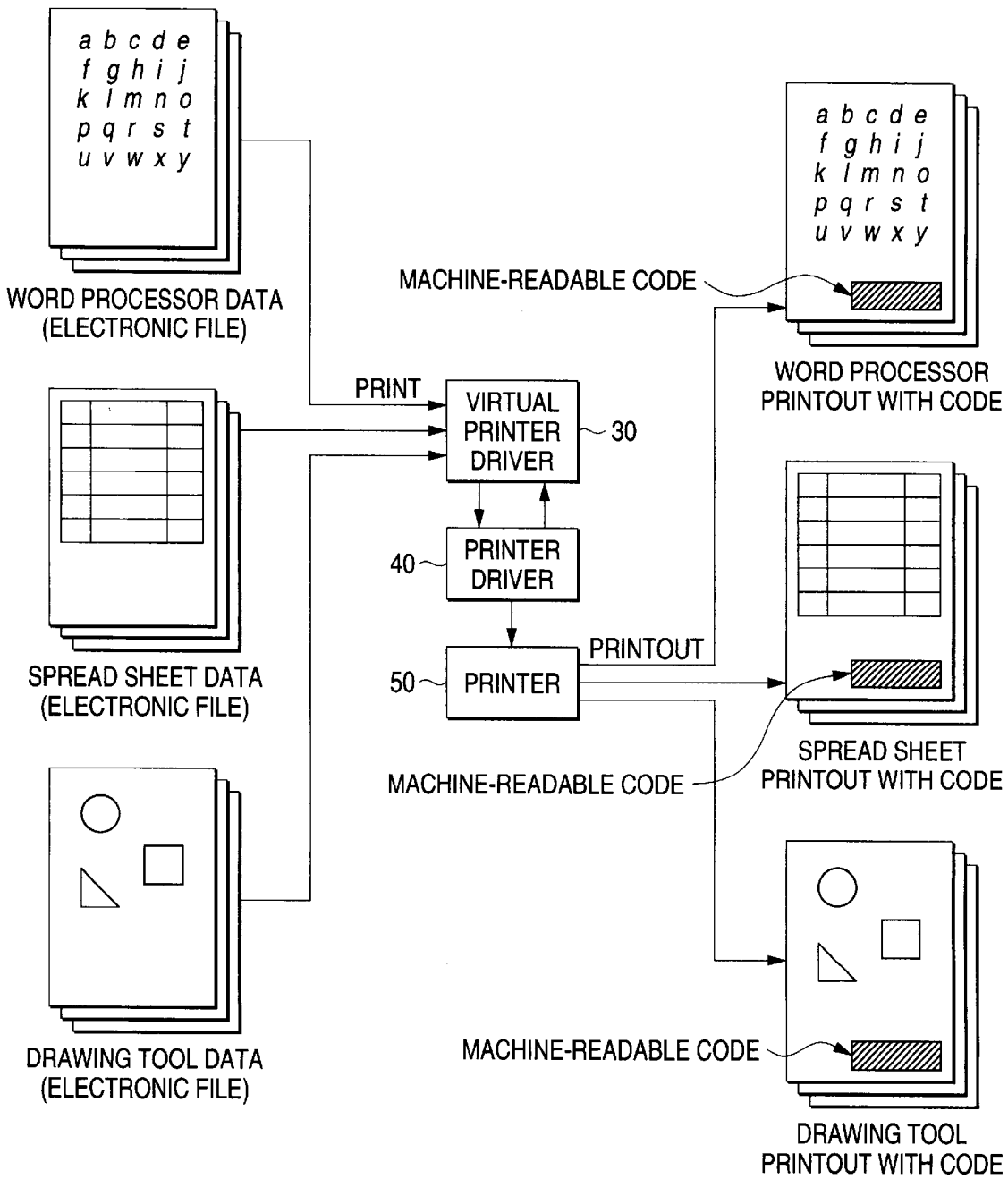
FIG. 7 is an illustration to show a printout image in the code embedding and printing operation.

As an example, FIG. 7 shows a print image for embedding machine-readable code (filled-in portions in FIG. 7) in electronic files from applications 10 of word processor, spread sheet, and drawing tool and printing the electronic files with the machine-readable code embedded.

In the print processing, first, when the user executes printing the electronic file in each application 10, a print dialog as shown in FIG. 3 is displayed. Here, the user enters the data to be coded (coded data) as machine-readable code. Particularly, an example of specifying "INTEGER" as the data type and coding "1234567890" as the value is shown on the print dialog in FIG. 3. If the user presses an OK button on the print dialog after entering the coded data, the coded data is coded in the virtual printer driver 30 and the resultant data is merged into the first intermediate data to generate second intermediate data, then the second intermediate data becomes print data reproduced in a GDI code string and the print data is passed to the printer driver 40, then printout with the coded data embedded as shown in FIG. 7 can be provided at the printer 50.

According to the printing system of the present invention having the virtual printer driver 30 being placed between the application 10 and the printer driver 40 for embedding machine-readable code in the intermediate code that can be reproduced in a GDI code string, from every application of word processor, spread sheet, drawing tool, etc., as shown in FIG. 7 having a print function, machine-readable code can be embedded in an electronic file in the application and printed if any printer 50 is used.

Bar code, data griff, etc., can be used as the machine-readable code embedded and printed in the printing system. A registration ID used when an electronic file to be printed is registered in a server is possible, as described later, as the machine-readable code content. In this case, the machine-readable code is read and scanned through a scanner on output paper with the machine-readable code embedded and printed, the registration ID is recognized from the scan result, and the electronic file corresponding to the registration ID can be retrieved from the server.

Possible as other examples of the machine-readable code are various pieces of information such as the identifier of a printed electronic file, the name of the host device supplying the electronic file, the name of the OS or user creating the electronic file, and the print date and the number of pages of the electronic file. Further, a character string such as "important" or "confidential" can also be watermarked in the electronic file printed on output paper.

In the example, the machine-readable code is previously merged into the first intermediate data to generate second intermediate data, then the second intermediate data is sent to the printer driver 40. However, alternatively, the machine-readable code may be sent as a GDI command string in processing of sending a print instruction to the printer driver 40.

By the way, in the machine-readable code embedding and printing processing described above, application data is not converted and additional information of server registration ID, etc., is added to the application data and printing is performed. In addition, the printing system of the present invention can also adopt a configuration for converting application data and printing out. N-up print, scaled-up or scaled-down print, or the like are possible as examples of print processing involving such data conversion. Processing of creating some file having a format that can be used with the virtual printer driver 30 is also applied. To add such a print processing function, for example, a second intermediate data generating section 303B comprising code data analyzing section 3031 and a data conversion section 3034 as shown in FIG. 8 may be used as the second intermediate data generating section 303 in the virtual printer driver 30.

Figure 8:
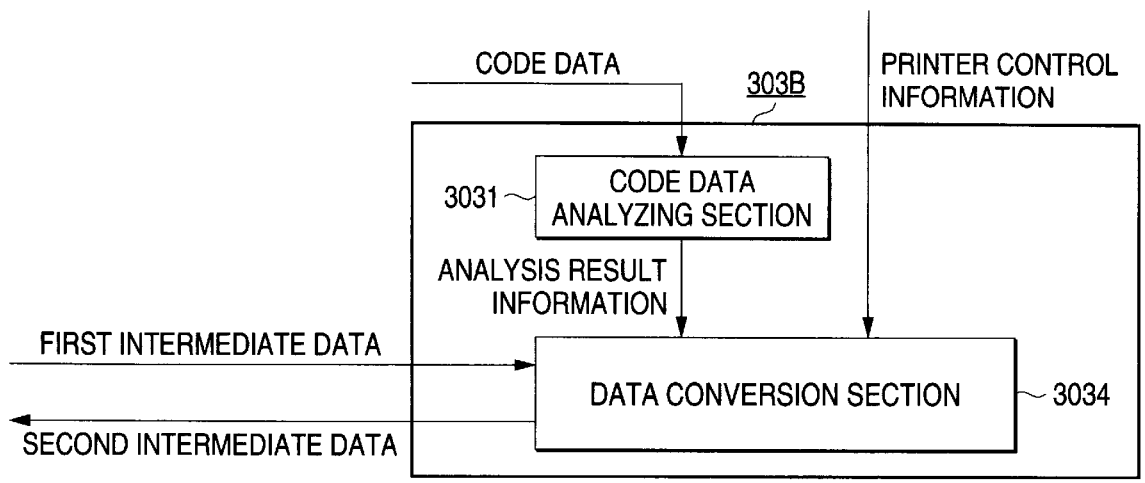
FIG. 8 is a block diagram to show the configuration of a second intermediate data generating section adaptable to print processing involving data conversion.

Print processing of the printing system adopting the second intermediate data generating section 303B in the virtual printer driver 30 will be discussed briefly. The print processing of the print system can be realized by replacing steps S424 to S427 of the virtual printer driver 30 in the flowcharts shown in FIGS. 4(a) and (b) in the printing system for embedding and printing additional information of machine-readable code, etc., with the following process:

Now, assume that N-up print is specified on the print dialog shown in FIG. 3 after a print instruction is given from the application 10 in the printing system using the second intermediate data generating section 303B as shown in FIG. 8. Upon completion of setting on the print dialog, the code data of the electronic file instructed to be printed is input from the application 10 to the virtual printer driver 30 and the print parameter specifying the N-up print is input from the user input section 20 to the virtual printer driver 30.

When the virtual printer driver 30 receives the code data input from the application 10, first the first intermediate data generating section 302 generates first intermediate data in a format to enable the data to be reproduced as GDI code in the later processing based on the received code data and stores the first intermediate data on the data storage section 304.

In the second intermediate data generating section 303B (see FIG. 8) of the virtual printer driver 30, the code data analyzing section 3031 analyzes the code data received from the application 10 and sends the analysis result to the data conversion section 3034. On the other hand, the print parameter input from the user input section 20 is read into the data conversion section 3034.

After this, the data conversion section 3034 reads first intermediate data from the data storage section 304, then converts the first intermediate data into data for the N-up print according to the print parameter input from the user input section 20 while referencing the analysis result of the code data analyzing section 3031, thereby generating second intermediate data, and stores the second intermediate data in the data storage section 304.

Further, in the virtual printer driver 30, the print data generating section 305 reproduces a GDI command string from the second intermediate data for generating print data and sends the print data together with the print instruction to the printer driver 40.

Upon reception of the print instruction and the print data (GDI command string) from the virtual printer driver 30, the printer driver 40 starts the printer 50 and outputs the print data. Further, the printer 50 prints out the print data received from the printer driver 40.

Figure 9:
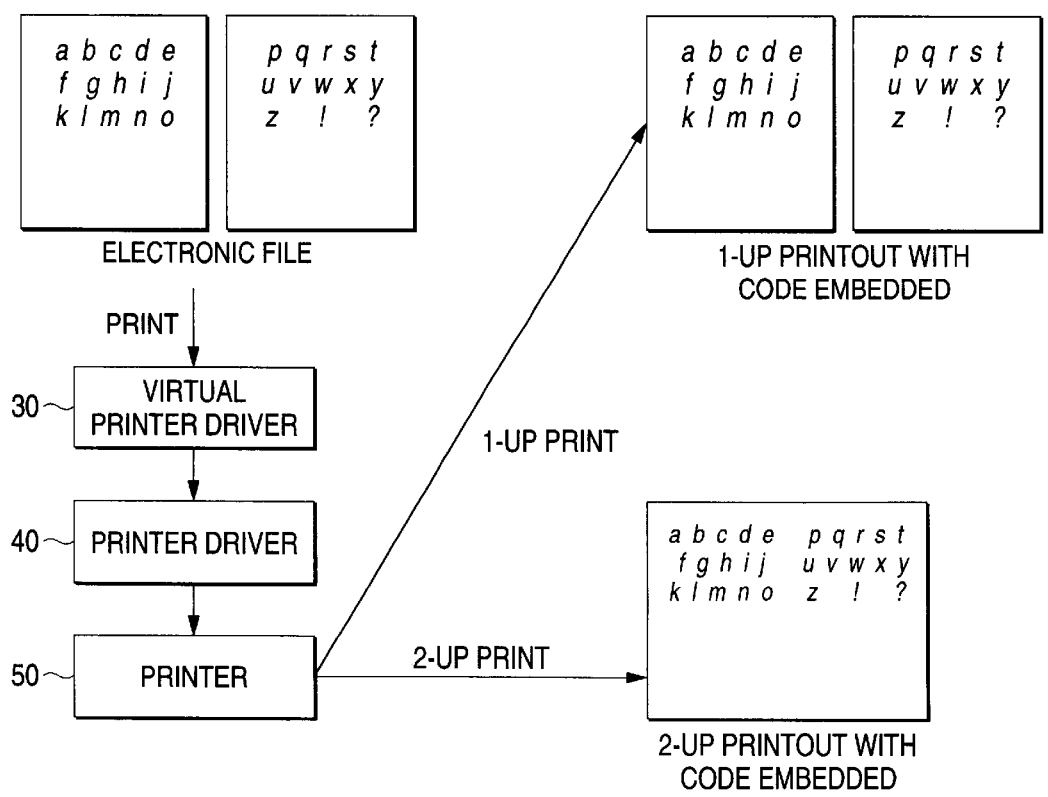
FIG. 9 is an illustration to show a printout example in the print processing operation involving data conversion.

FIG. 9 shows a printout example based on the print processing. In this printout example, if 1-up print is specified for an electronic file consisting of two pages, the two pages of the electronic file are normally printed on two sheets of output paper in a one-to-one correspondence; if 2-up print is specified for the electronic file, the two pages of the electronic file are printed on one sheet of output paper.

To execute scaled print in addition to the N-up print or obtain some data for use with the virtual printer driver 30, similar processing can also be applied.

In the example, processing of adding additional information to the application data instructed to be printed and printing and processing of converting application data instructed to be printed into data for N-up print or scaled-down or scaled-up print are executed separately, but a system configuration for performing both the former processing and the latter processing is also possible.

Figure 10:
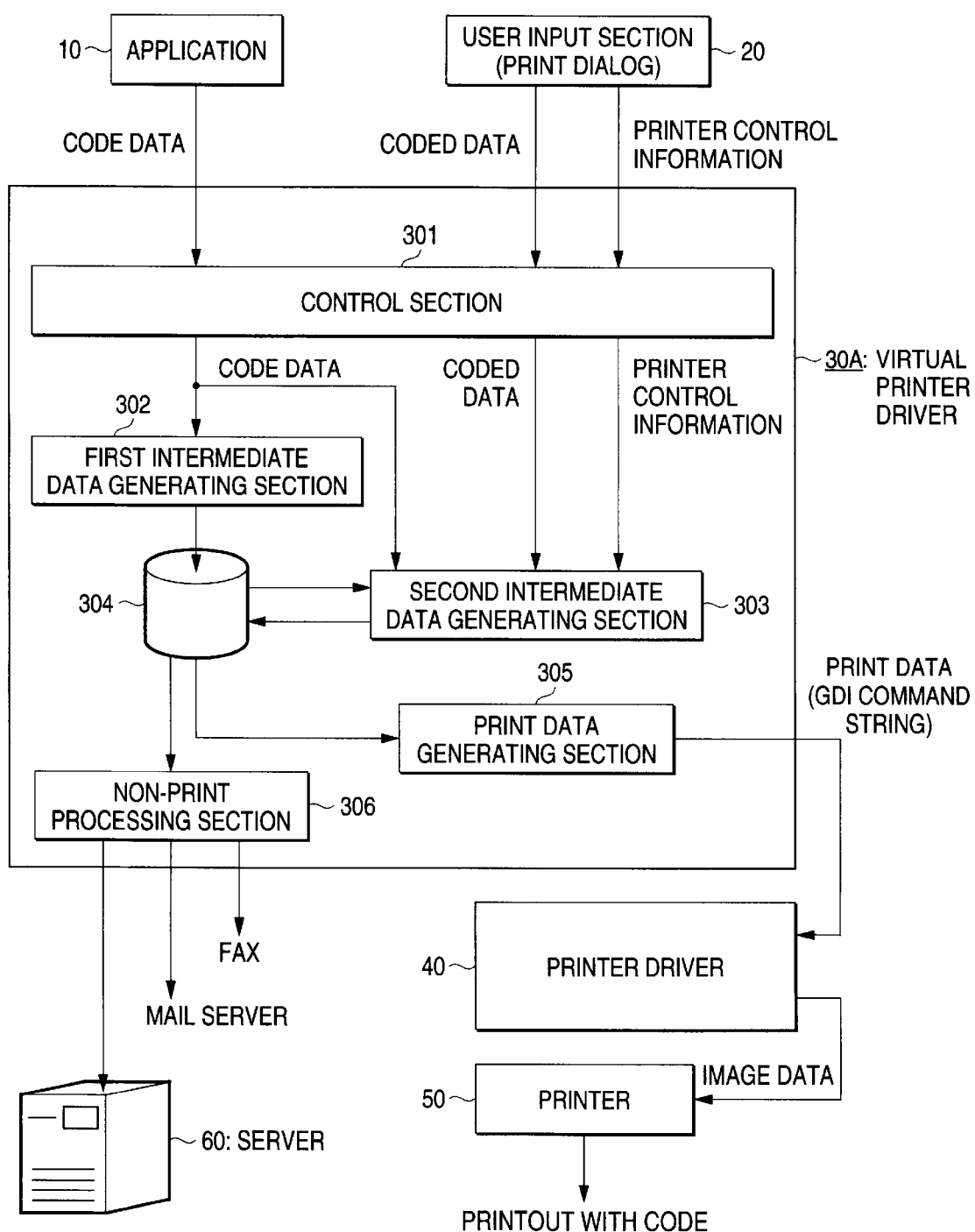
FIG. 10 is a block diagram to show a schematic configuration of a printing system according to another embodiment of the present invention.

Next, another embodiment of the present invention will be discussed. FIG. 10 is a block diagram to show a schematic configuration of a printing system according to another embodiment of the present invention. Parts identical with or similar to those previously described with reference to FIG. 1 are denoted by the same reference numerals in FIG. 10.

Figure 11:
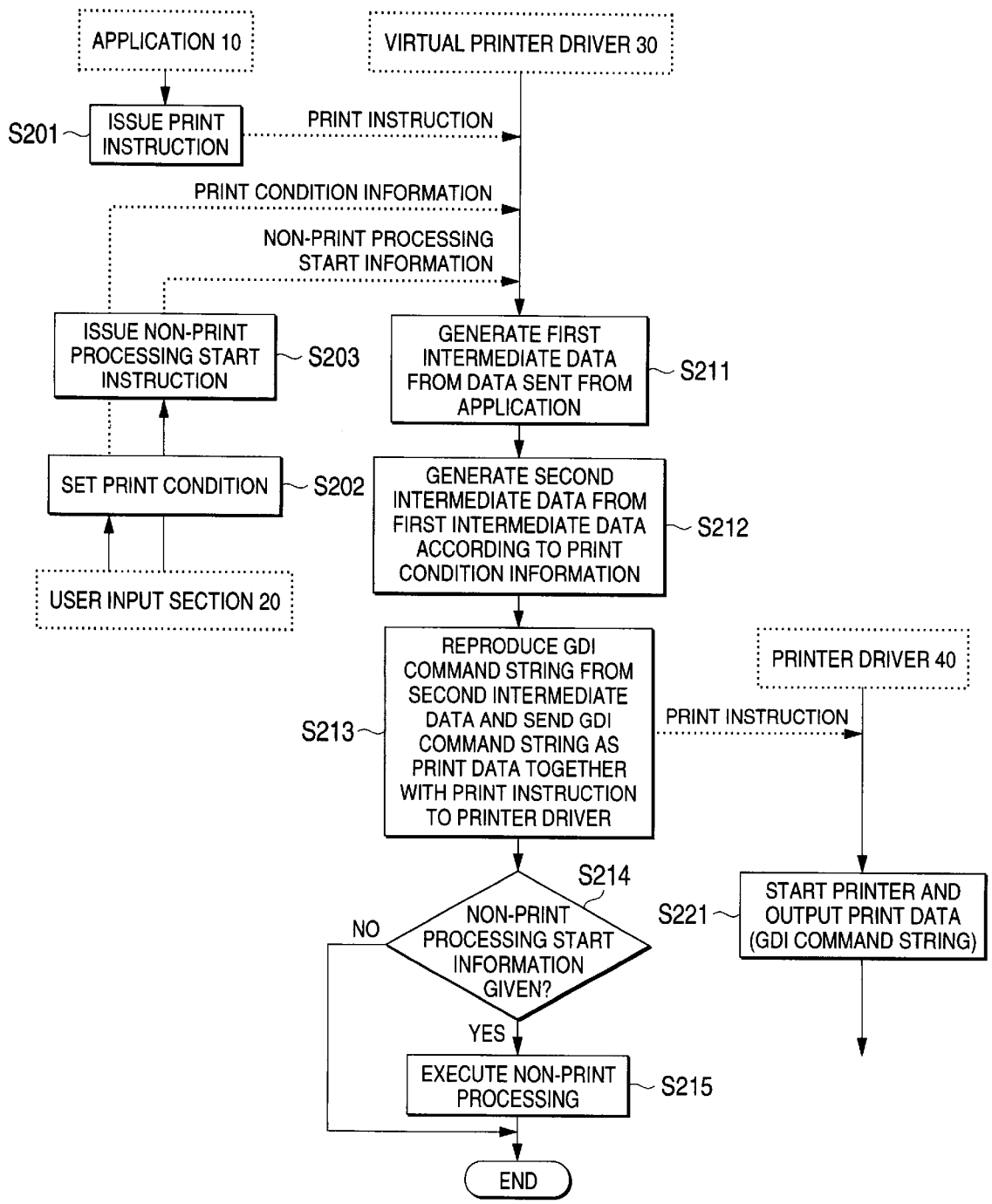
FIG. 11 is a flowchart to show the print processing operation of the printing system in FIG. 10.

In the printing system, a virtual printer driver 30A is provided with a non-print processing control section 306 for controlling processing other than print processing when application data instructed to be printed from an application 10 is printed. The non-print processing control section 306 is connected to an external device such as a server 60 via a predetermined interface. The general operation of the printing system will be discussed with reference to a flowchart shown in FIG. 11. Steps identical with or similar to those previously described with reference to FIG. 2 are denoted by the same numerals in FIG. 11.

To print any electronic file from the application 10 in the printing system, the user issues an instruction for printing the electronic file to be printed at step S201. When the print instruction is issued, a user input section 20 displays a print dialog, for example, as shown in FIG. 3, and accepts setting of print conditions related to the electronic file instructed to be printed at step S202.

In the printing system, an instruction to start non-print processing other than print processing for the electronic file instructed to be printed is issued by using a dialog (not shown) different from the print dialog or a predetermined input function at step S203.

Upon completion of setting the print conditions and issuing the instruction to start non-print processing, the code data of the electronic file instructed to be printed is input from the application 10 to the virtual printer driver 30A and the user-setup print parameters of N-up print, etc., and coded data are input from the user input section 20 to the virtual printer driver 30A. At this time, the information input from the user input section 20 also includes the non-print processing start instruction information.

In the virtual printer driver 30A, first, a first intermediate data generating section 302 generates first intermediate data from the code data sent from the application 10 at step S211 and stores the first intermediate data in a data storage section 304. On the other hand, the print condition information set by the user is input from the user input section 20 to a second intermediate data generating section 303, which then generates second intermediate data according to the print conditions from the first intermediate data stored in the data storage section 304 at step S212 and stores the second intermediate data on the data storage section 304.

Next, a print data generating section 305 reproduces a GDI command string from the data stored in the second intermediate data on the data storage section 304 and sends the GDI command string as print data together with the print instruction to a printer driver 40 at step S213.

The printer driver 40 starts a printer 50 in response to the print instruction sent from the print data generating section 305 and outputs the print data (GDI command string) sent together with the print instruction to the printer 50 at step S221. Further, the printer 50 prints out the print data.

After sending the print instruction at step S213, a control section 301 in the virtual printer driver 30A checks whether or not an instruction to start non-print processing is input from the user input section 20 at step S214. If an instruction to start non-print processing is not input (NO at step S214), the control section 301 terminates the processing. In contrast, if an instruction to start non-print processing is input (YES at step S214), the control section 301 starts the non-print processing control section 306 for executing the non-print processing instructed to be started at step S215.

For example, to print application data and register the data in the server 60 in the printing system shown in FIG. 10, instruction information meaning "server registration" is input as the non-print processing start instruction at step S203. At this time, the control section 301 in the virtual printer driver 30A recognizes that a "server registration" start instruction is given based on the instruction information (YES at step S214), and sends a server registration start notification to the non-print processing control section 306. When receiving the notification, the non-print processing control section 306 reads the second intermediate data stored on the data storage section 304 and adds registration ID specified using the print dialog, for example, to the second intermediate data, then registers the second intermediate data in the server 60.

In addition, if a mail server or a facsimile machine is connected as an external device and a control function of the external device is added to the non-print processing control section 306, while a specified electronic file is printed in response to a print instruction from the application 10, it can be transmitted by mail through the mail server or can be transferred to the facsimile machine through which the electronic file can be transmitted to the receiving party.

As has been described heretofore, according to the present invention, intermediate data to enable print data adaptable to print processing of a printer is generated from application data instructed to be printed from an application and further the print data is reproduced from the intermediate data and is sent to the printer. Therefore, data of various applications having a printing function can be printed out at any printers.

In the present invention, there is added a processing function of merging machine-readable code on the intermediate data. Therefore, to embed machine-readable code in application data and print the application data with the machine-readable code embedded, the application data with the machine-readable code embedded can be printed at any printer.

In the present invention, there is added a function of converting application data instructed to be printed from an application on the intermediate data. Therefore, to execute N-up print, scaled print, etc., for the application data, the application data can be printed at any printer.

Further, in the present invention, there is added a function of executing non-print processing operation while performing print data preparation processing, so that the non-print processing operation of server registration, facsimile transmission, etc., of application data can be performed concurrently with print processing of the application data.

What is claimed is:

1. A printing system for printing application data instructed to be printed from an application at a printer, the printing system comprising:

first intermediate data preparation means for preparing first intermediate data from the application data;

second intermediate data preparation means for preparing second intermediate data having the same data format as the first intermediate data from the first intermediate data; and print data preparation means for preparing print data that can be processed at the printer from the second intermediate data.

2. The printing system as set forth in claim 1 wherein the second intermediate data preparation means includes data merge means for merging a machine-readable code into the first intermediate data, thereby preparing the second intermediate data.

3. The printing system as set forth in claim 2 wherein the machine-readable code is at least any one of identification information, print date information, number-of-page information, source host device information, and information of operation system name in which the application data is prepared.

4. The printing system as set forth in claim 1 wherein the second intermediate data preparation means includes data conversion means for converting the first intermediate data into data corresponding to print control information specified accompanying the print instruction, thereby preparing the second intermediate data.

5. The printing system as set forth in claim 4 wherein the print control information is any one of control information pieces specifying N-up print, scaled-up print, and scaled-down print for the application data.

6. The printing system as set forth in claim 1 further comprising:

operation instruction means for specifying non-print processing operation other than print processing for the application data; and non-print processing control means for executing the non-print processing operation instructed by the operation instruction means while print data preparation processing is performed by the print data preparation means.

7. The printing system as set forth in claim 6 wherein the non-print processing operation is at least any one of processing operation of registering the second intermediate data in a server, processing operation of transmitting the second intermediate data by mail, and processing operation of transmitting the second intermediate data with a facsimile machine.

* * * * *